(12) United States Patent
Yan (10) Patent No.: US 7,689,183 B2
(45) Date of Patent: Mar. 30, 2010

(54) CONTROL METHOD FOR PRODUCING A RAMP OF OUTPUT POWER AND TRANSMITTER UTILIZING THE SAME

(75) Inventor: Liang Yan, Taipei County (TW)

(73) Assignee: Via Technologies, Inc., Taipei (TW)

( * ) Notice: Subject to any disclaimer, the term of this patent is extended or adjusted under 35 U.S.C. 154(b) by 562 days.

(21) Appl. No.: 11/613,211

(22) Filed: Dec. 20, 2006

(65) Prior Publication Data

US 2007/0142007 A1 Jun. 21, 2007

Related U.S. Application Data (60) Provisional application No. 60/752,321, filed on Dec. 20, 2005.

(51) Int. Cl.
*H04B 1/04* (2006.01)

(52) U.S. Cl. .................. 455/127.1; 455/126; 455/127.3

(58) Field of Classification Search ... 455/127.1–127.5, 455/126, 91
See application file for complete search history.

(56) References Cited

U.S. PATENT DOCUMENTS 5,894,473 A * 4/1999 Dent .......................... 455/450
7,130,653 B2 * 10/2006 Lin .......................... 455/127.1

* cited by examiner

*Primary Examiner*—Lana N Le
(74) *Attorney, Agent, or Firm*—Thomas, Kayden, Horstemeyer & Risley (57) ABSTRACT

A transmitter controlling output power to generate a ramp and a method thereof. The transmitter comprises a baseband module, a transmitter module, and a power amplifier. The baseband module receives a power control level, determines a scaling factor according to the power control level, determines a difference between an upper power limit and lower power limit according to a position on the ramp, and calculates a control signal according to the scaling factor, the lower power limit, and the difference. The transmitter module transmits data. The power amplifier coupled to the baseband module and the transmitter module, outputs the data with the output power according the control signal.

12 Claims, 9 Drawing Sheets

CONTROL METHOD FOR PRODUCING A RAMP OF OUTPUT POWER AND TRANSMITTER UTILIZING THE SAME

BACKGROUND OF THE INVENTION

1. Field of the Invention

The invention relates to wireless communication systems, and in particular to a device and method of calculating output power in a wireless communication system.

2. Description of the Related Art

When a mobile station (MS) transmits data, it is required to control the power of transmitting data to reduce the transmission power, as well as to maintain a satisfactory level of data transmission quality.

Figure 1:
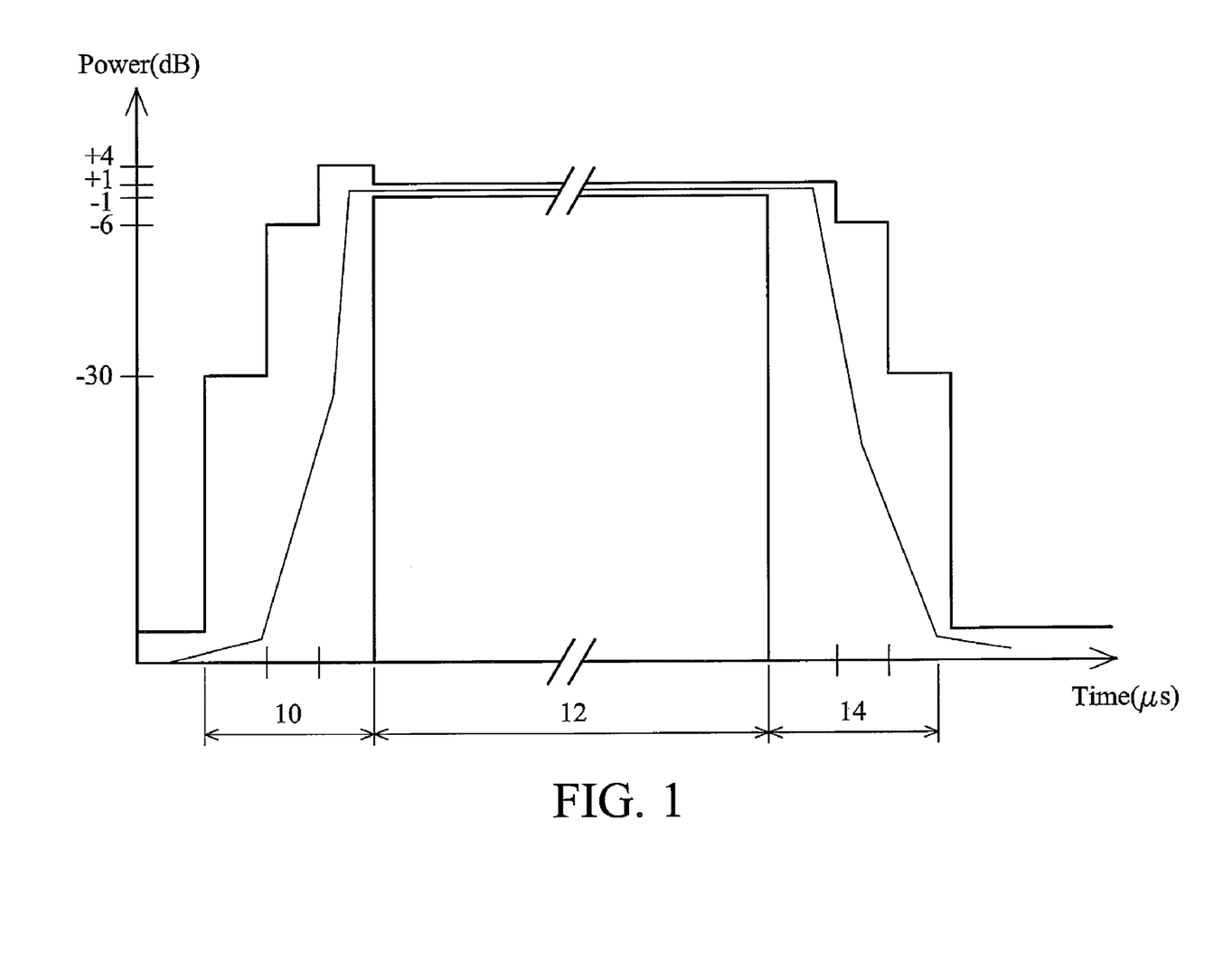
FIG. 1 shows output powers of a transmitter compliant to 3GPP.

FIG. 1 shows output power of a transmitter compliant to 3GPP Standard, where the horizontal axis represents time and the vertical axis represents output power. For each power control level (PCL), 3GPP Standard specifies a corresponding output power limit. For each data burst, the output power increases in Stage 10, remains substantially constant in Stage 12, and decreases in Stage 14. The power ramp-up and ramp-down corresponding to Stages 1 0 and 14 can reduce signal interferences and noises, thereby increasing the data transmission quality. A transmitter transmits data with an output power selected by a power control level during Stage 12. The duration of Stages 10, 12, and 14, and the ramp-up and ramp-down power are clearly specified in the associated telecommunication specification.

The prior art utilizes a lookup table that establishes a number of estimates approximating ramp output power for each selected power control level. A mobile station reads a corresponding ramp output power estimate upon receiving a power control level to generate the ramp in Stages 10 and 14. Unfortunately, the prior art requires large memory resource for storing the estimates of ramp output power, and processing power for accessing the estimates to generate the ramp output in Stages 10 and 14.

Thus a need exists for a device and method of calculating output power to utilize system resources efficiently.

BRIEF SUMMARY OF THE INVENTION

A detailed description is given in the following embodiments with reference to the accompanying drawings.

According to an embodiment of the invention, a transmitter controlling output power to generate a ramp disclosed in the specification comprises a baseband module, a transmitter module, and a power amplifier. The baseband module configure to receive a power control level, to determine a scaling factor according to the power control level, to determine a difference between an upper power limit and lower power limit according to a position on the ramp, and to calculate a control signal according to the scaling factor, the lower power limit, and the difference. The transmitter module transmits data. The power amplifier, coupled to the baseband module and the transmitter module, outputs the data with the output power according the control signal.

According to another embodiment of the invention, a method of controlling output power to generate a ramp in a transmitter comprising receiving a power control level, calculating a control signal according to the power control level and a position on the ramp, and outputting the output power according the control signal.

According to yet another embodiment of the invention, a transmitter controlling output power to generate a ramp comprises a baseband module and a power amplifier. The baseband module receives a power control level and calculates a control signal according to the power control level and a position on the ramp. The power amplifier, coupled to the baseband module, outputs the output power according the control signal.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limit sense. The scope of the invention is best determined by reference to the appended claims.

Scope of the invention may include, but is not limited to cellular, video/audio broadcast, Local Area Network (LAN), Wireless LAN (WLAN), satellite communications, and the like.

Table 1 shows the nominal output power corresponding to power control level (PCL) specified in Global System for Mobile communication (GSM) standard, under normal and extreme conditions:

TABLE 1

| Power Control Level | Nominal output power (dBm) | Tolerance (dB) normal | Tolerance (dB) extreme |
|---|---|---|---|
| 0-2 | 39 | ±2 | ±2.5 |
| 3 | 37 | ±3 | ±4 |
| 4 | 35 | ±3 | ±4 |
| 5 | 33 | ±3 | ±4 |
| 6 | 31 | ±3 | ±4 |
| 7 | 29 | ±3 | ±4 |
| 8 | 27 | ±3 | ±4 |
| 9 | 25 | ±3 | ±4 |
| 10 | 23 | ±3 | ±4 |
| 11 | 21 | ±3 | ±4 |
| 12 | 19 | ±3 | ±4 |
| 13 | 17 | ±3 | ±4 |
| 14 | 15 | ±3 | ±4 |
| 15 | 13 | ±3 | ±4 |
| 16 | 11 | ±5 | ±6 |
| 17 | 9 | ±5 | ±6 |
| 18 | 7 | ±5 | ±6 |
| 19-31 | 5 | ±5 | ±6 |

In a dual-band mobile station, GSM uses power control level PCL 5 to 19 and DCS uses power control level PCL 0 to 15 to perform power control of data transmission. For example, if a mobile station chooses power control level PCL 6 to transmit data under normal condition, the mobile station transmits nominal output power in the range of (31±3)dBm, or from 28 to 34 dBm.

Figure 2:
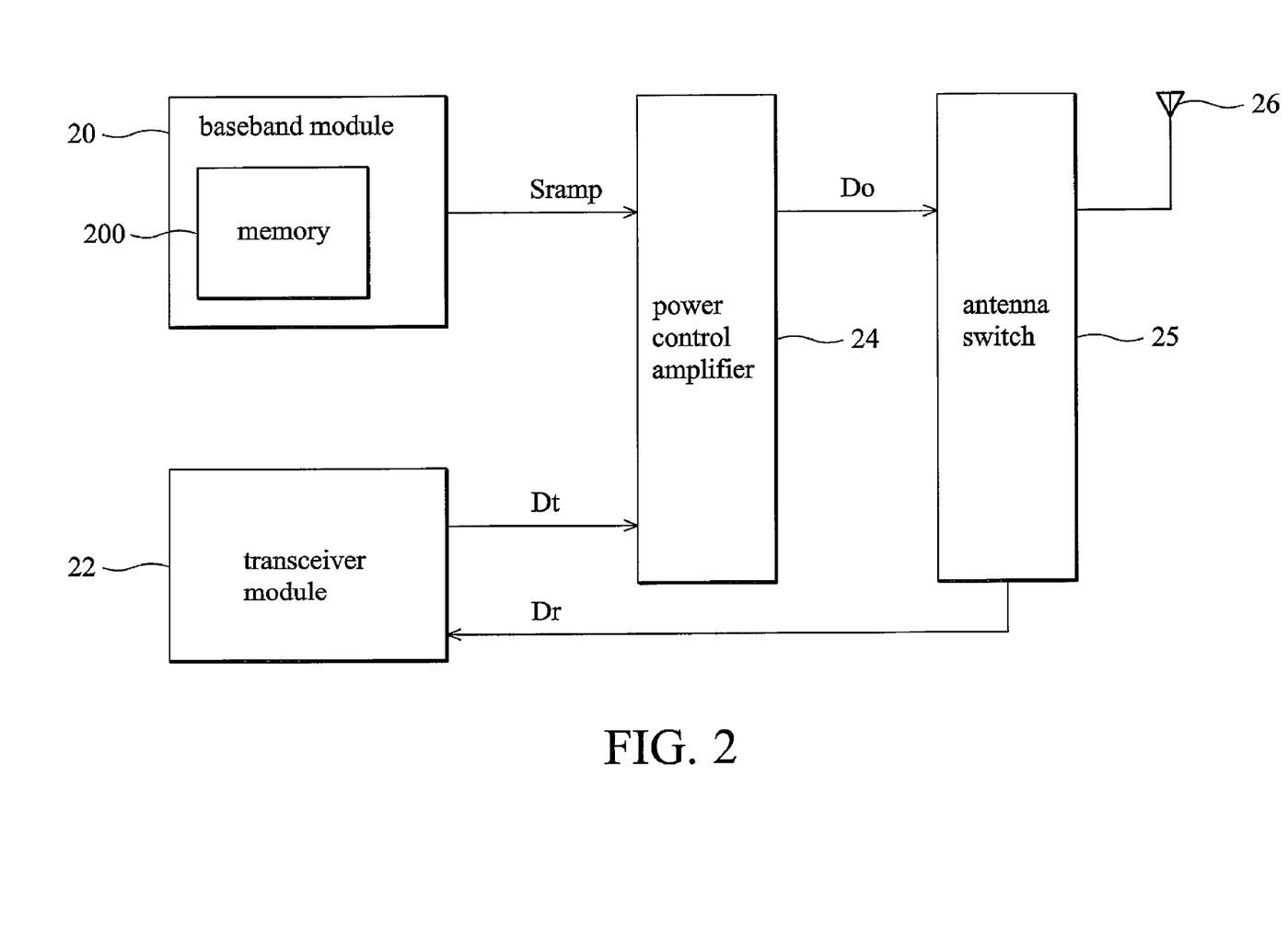
FIG. 2 is a block diagram of a transmitter performing power control according to the invention.

FIG. 2 is a block diagram of a transmitter performing power control according to the invention, comprising baseband module 20, transceiver module 22, power control amplifier 24, antenna switch 25, and antenna 26. Baseband module 20 and transmitter module 22 are coupled to power control amplifier 24, antenna switch 25, and subsequently to antenna 26. In one embodiment, the transceiver module 22 could further comprise a transmitter module and a receiver module. In this regards, the transmitter module ouputs signal Dt to the power control amplifier 24. The receiver module receive signal from the antenna switch 25. The receiving and transmitting direction of the antenna switch 25 is controlled by the transceiver module 22, or the transmitter module and the receiver module.

Baseband module 20 produces ramp signal $S_{ramp}$ to power control amplifier 24 to generate ramped output power. Baseband module 20 comprises memory 200, storing parameters for calculating ramp signal $S_{ramp}$, including ramp gradient m[k], difference between upper and lower power control limits ΔPCL[i], and lower power control limit $PCL_{low}DAC[i]$. Ramp signal $S_{ramp}$ may be an analog or digital signal which may be represented in the form of voltage or current, controlling the ramp of output power of power amplifier 24. Ramp signal $S_{ramp}$ may constitute a predetermined number N of estimates. For example, predetermined number N is 16, ramp signal $S_{ramp}$ constitutes 16 continuously increasing or decreasing estimates, controlling the output power of power control amplifier 24 by digital-to-analog conversion. Ordinary people in the skilled art could understand that any form or types of $S_{ramp}$ and the number N could be used in the embodiments in accordance with the present invention.

Figure 3A:
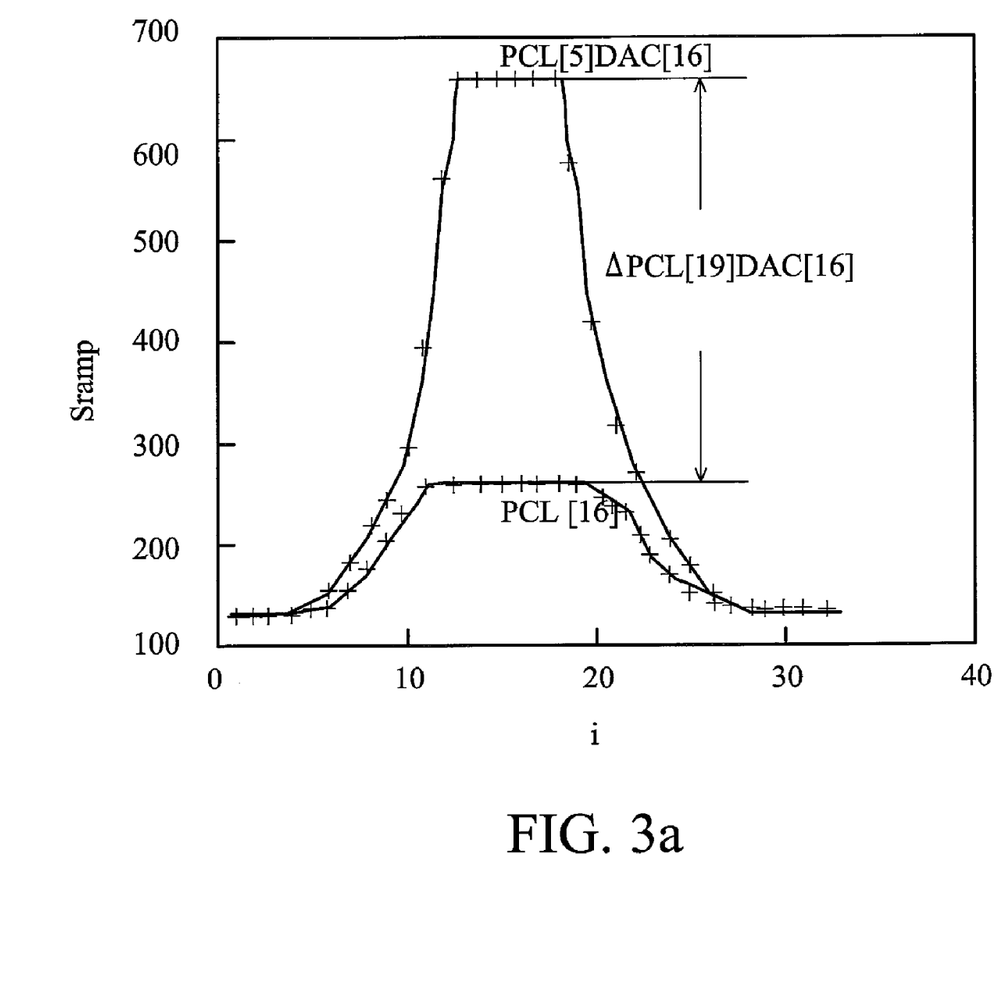
FIG. 3a shows the upper and lower power limits for ramp signal $S_{ramp}$.
Figure 3B:
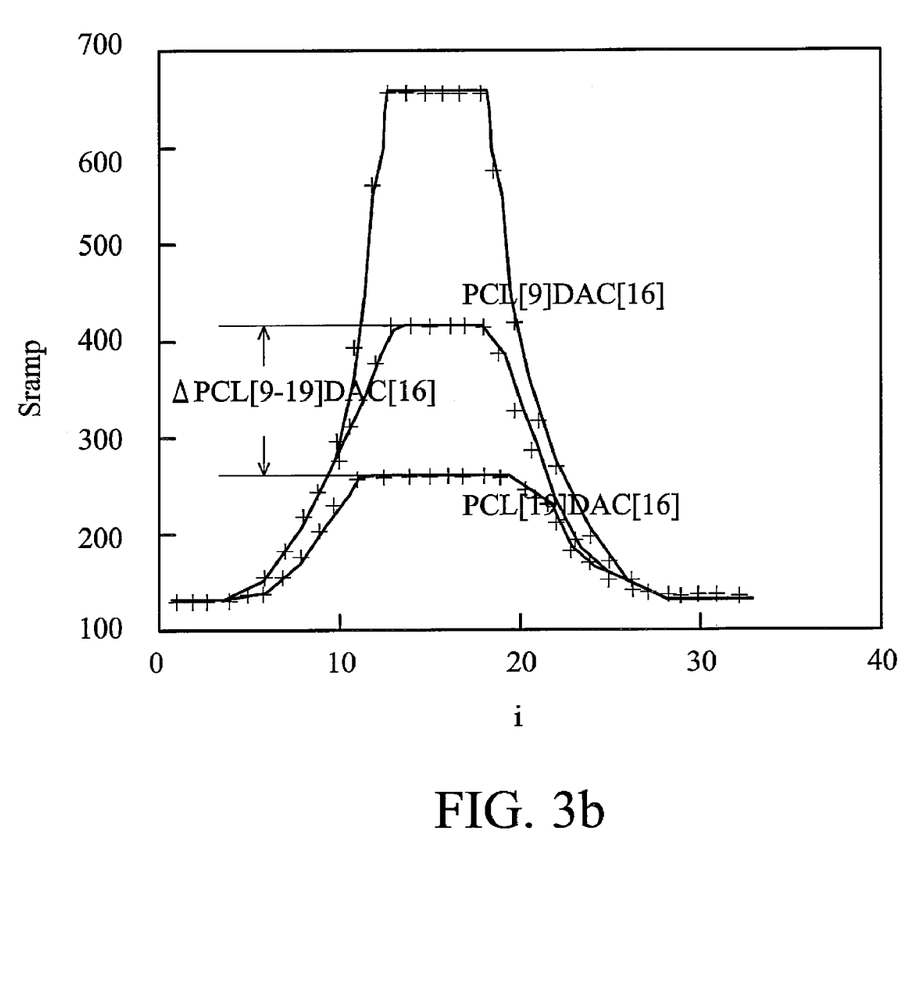
FIG. 3b shows PCL 9 and the lower power limit of ramp signal $S_{ramp}$.
Figure 4:
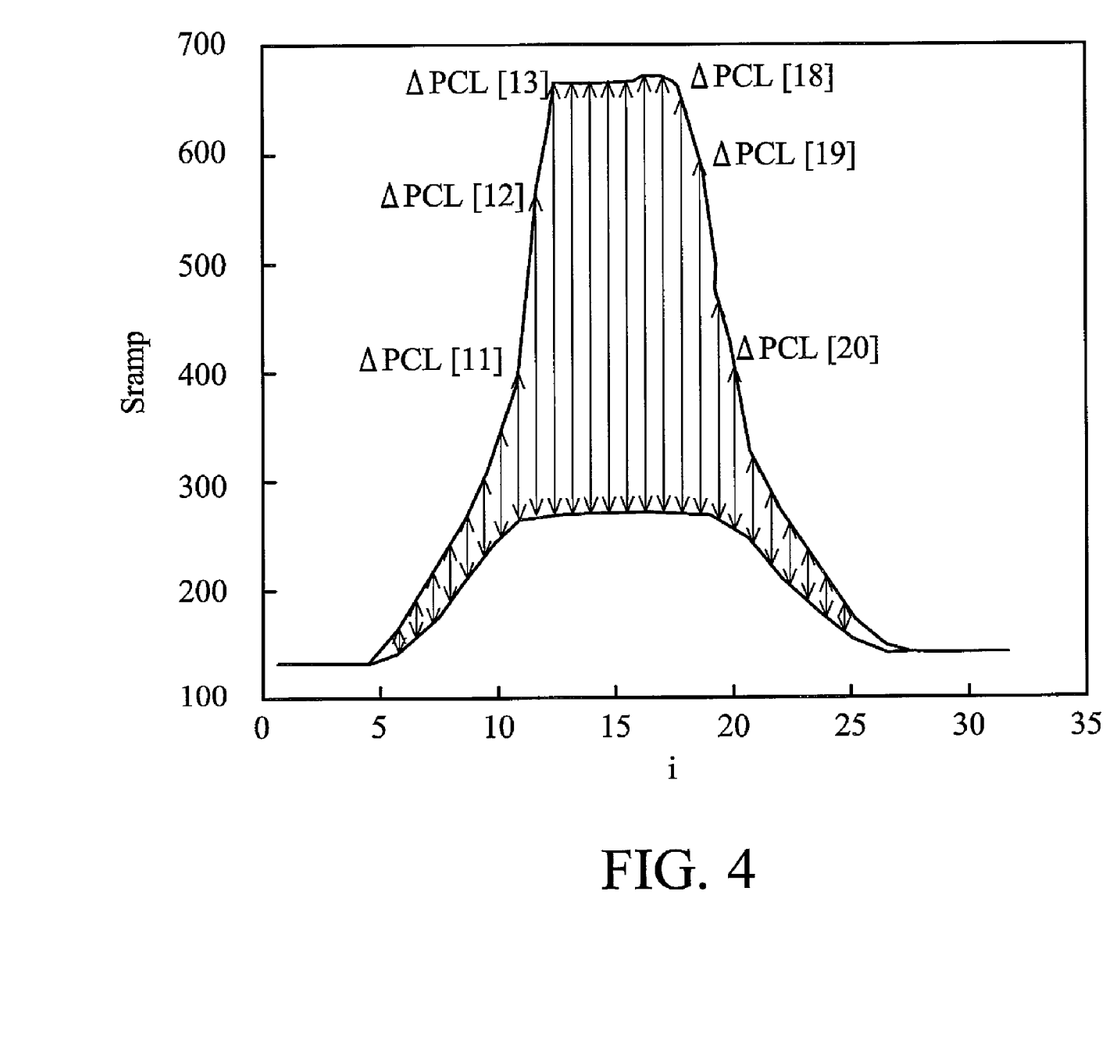
FIG. 4 shows the difference between each estimate of the upper and lower power limit.

FIGS. 3a, 3b and 4 show methods of calculating ramp signal $S_{ramp}$ according to the invention. FIG. 3a shows the upper and lower power limits for ramp signal $S_{ramp}$, where the horizontal axis represents index i, and vertical axis represent ramp signal $S_{ramp}$. The upper power limit is the maximal ramp signal $S_{ramp}$ defined in the telecommunication specification, generating the maximal output power in power control amplifier 24. The lower power limit is the minimal ramp signal $S_{ramp}$ defined in the telecommunication specification, generating the minimal output power in power control amplifier 24. Taking GSM Standard as an example, power control level PCL 5 results in the upper power limit, power control level PCL 19 results in the lower power limit, therefore scaling factor m[k] of PCL k is represented by:

$$m[k] = \frac{PCL[k]DAC[16] - PCL[19]DAC[16]}{PCL[5]DAC[16] - PCL[19]DAC[16]}$$

where PCL[5]DAC[16]—PCL[19]DAC[16] is shown in FIG. 3a, and PCL[k]DAC[16]—PCL[19]DAC[16] is shown in FIG. 3a, with k being 9.

The $16^{th}$ estimate in FIG. 3a is the peak value of the limits, and the difference between the peak values of the upper and lower power limits is represented by ΔPCL[16]. FIG. 3b shows PCL 9 and the lower power limit of ramp signal $S_{ramp}$, the deference between the peak values thereof is indicated by ΔPCL[9-16]DAC[16]. FIG. 4 shows the difference between each estimate of the upper and lower power limit, represented by ΔPCL[i] for the $i^{th}$ difference. In an embodiment, baseband module 20 utilizes scaling factor m[k] proportional to the ratio of peak differences for the $k^{th}$ power control level to calculate an estimate for the $i^{th}$ ramp signal $S_{ramp}$, i.e., baseband module 20 calculates the $i^{th}$ estimate of ramp signal $S_{ramp}$ according to power control level PCL and the position on the ramp, as shown in formula 1:

$$PCL[k]DAC[i] = m[k] * \Delta PCL[i] + PCL_{low}DAC[i] \quad [1]$$

where i is an index for the estimate of ramp signal $S_{ramp}$, k is an index of the power control level, PCL[k]DAC[i] estimates the $k^{th}$ power control level and the $i^{th}$ estimate of ramp signal $S_{ramp}$;

m[k] is a scaling factor of the $k^{th}$ power control level,

ΔPCL[i] is the difference between the $i^{th}$ estimate of the upper and lower power limit, and $PCL_{low}DAC[i]$ is the $i^{th}$ estimate of the lower power limit.

Scaling factor m[k] is represented by formula 2:

$$m[k] = \frac{PCL[k]DAC_{peak} - PCL_{low}DAC_{peak}}{PCL_{high}DAC_{peak} - PCL_{low}DAC_{peak}} \quad [2]$$

where ($PCL_{high}DAC_{peak}$-$PCL_{low}DAC_{peak}$) is the difference between the peak values of the upper and lower power limits, and ($PCL[k]DAC_{peak}$-$PCL_{low}DAC_{peak}$) is the difference between the peak values of power control level PCL k and the lower power limit.

In one embodiment, the transceiver module 22 shown in the FIG. 2 may comprise a transmitter module (not shown) and a receiver module (not shown). The transmitter module transmits data Dt to power control amplifier 24, and the receiver module receives data Dr from antenna 26. Data Dt may be a GSM or DCS data. GSM data utilizes power control level PCL 5-19, and DCS data power control level PCL 0-15.

Power control amplifier 24 modulates data Dt with ramp signal $S_{ramp}$ to produce output data Do to be transmitted through antenna 26. Antenna switch 25 can switch to either power control amplifier 24 or the transceiver module 22. When antenna switch 25 switches to power control amplifier 24, power control amplifier 24 produces ramp output power according to ramp signal $S_{ramp}$ calculated in baseband module 20 to transmit output data Do. When antenna switch 25 switches to transceiver module 22, transceiver module 22 receives data Dr from antenna 26 to continue further data process.

Thus the transmitter in FIG. 2 may store number k of scaling factors m[k], number i of differences between the upper and lower power limits ΔPCL[i], and number i of the lower power limit $PCL_{low}DAC[i]$ to calculate the estimates PCL[k]DAC[i] of all ramp signals $S_{ramp}$. In comparison to the prior art utilizing a lookup table storing all estimates PCL[k]DAC[i], the transmitter in the embodiment requires less memory space (k+i+i), the prior art uses more memory space (k*i), and the present invention reduces the access time for accessing estimates PCL[k]DAC[i] from the memory.

Figure 5A:
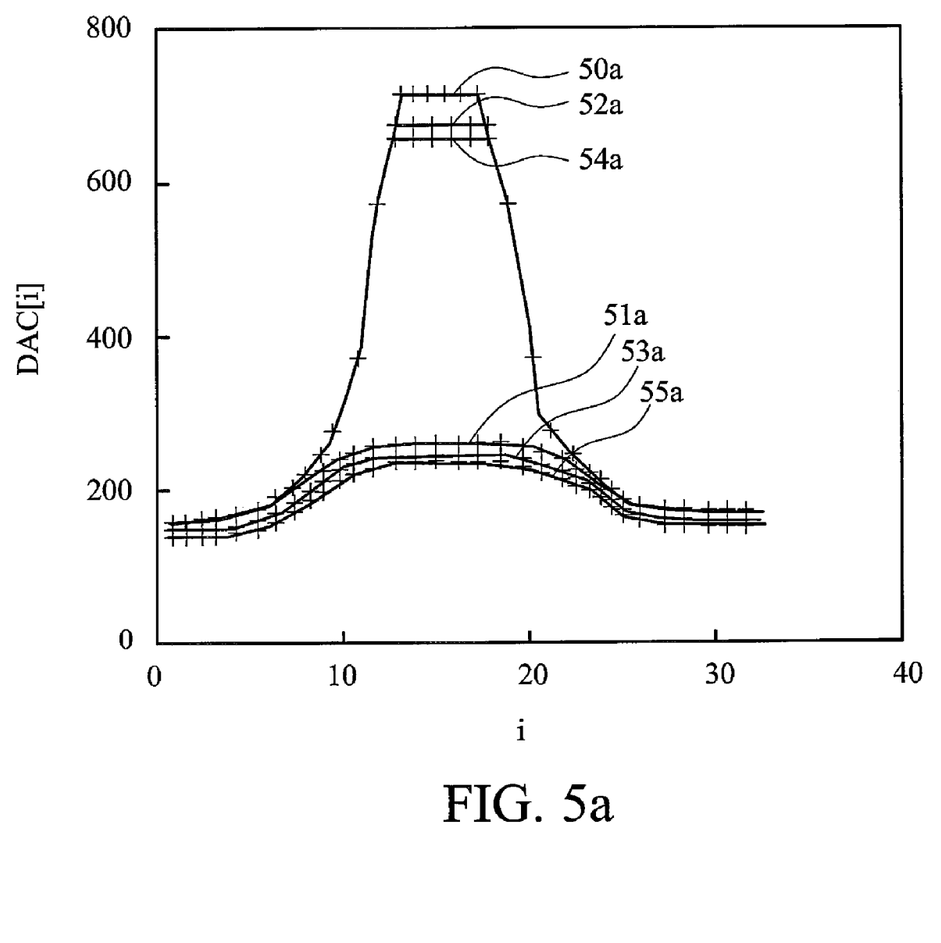
FIG. 5a shows changes of ramp signal $S_{ramp}$ under various extreme conditions.
Figure 5B:
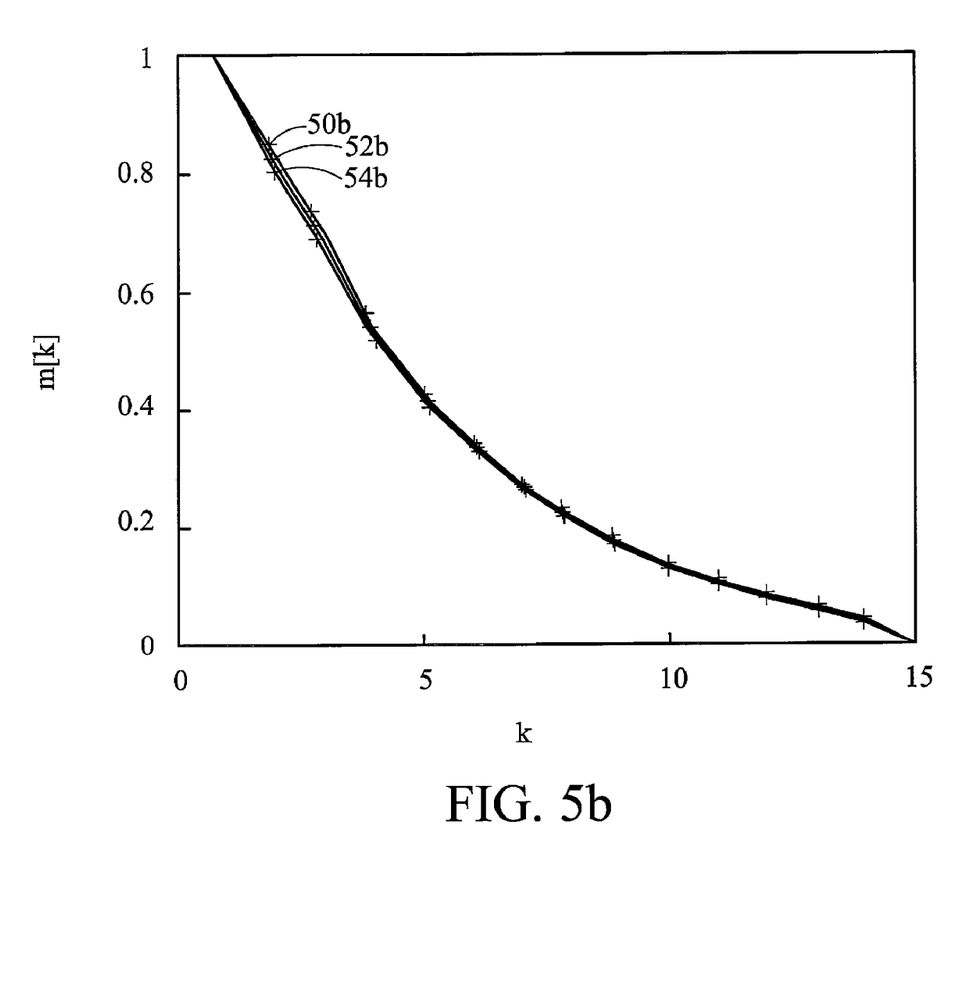
FIG. 5b shows changes of scaling factors m[k] under various extreme conditions.

FIGS. 5a and 5b show methods of compensating ramp signal $S_{ramp}$ under extreme conditions according to the invention, incorporating the transmitter in FIG. 2. FIG. 5a shows changes of ramp signal $S_{ramp}$ under various extreme conditions, where the horizontal axis represents index i, and the vertical axis represents ramp signal $S_{ramp}$, 50a, 52a, and 54a represent the upper power limits in 25°, 65°, and −10° respectively, and 51a, 53a, and 55a represent the lower power limits in 25°, 65°, and −10° respectively. FIG. 5b shows changes of scaling factors m[k] under various extreme conditions, where the horizontal axis represents index k, and the vertical axis represents scaling factors m[k], 50a, 52a, and 54a represent scaling factors m[k] in 25°, 65°, and −10° respectively. FIGS. 5a and 5b show that the upper and lower power limits change with the temperature change, while scaling factor m[k] remains unchanged. In an embodiment, compensation is performed on the difference ΔPCL[i] between the upper and lower power limits, and the lower power limit PCL$_{low}$DAC[i] only, scaling factor m[k] remains unchanged. Formulae 3 and 4 calculate compensation of the difference ΔPCL[i] between the upper and lower power limits and the lower power limit PCL$_{low}$DAC[i].

$$\Delta PCL[i]\text{comp}=\Delta PCL[i]+\text{comp1}(T) \quad [3]$$

$$PCL_{low}DAC[i]=PCL_{low}DAC[i]+\text{comp2}(T) \quad [4]$$

Where comp1(T) is a first temperature compensation factor for the difference ΔPCL[i] between the upper and lower power limits at temperature T, and Comp2(T) is a second temperature compensation factor for the lower power limit at temperature T.

Figure 6A:
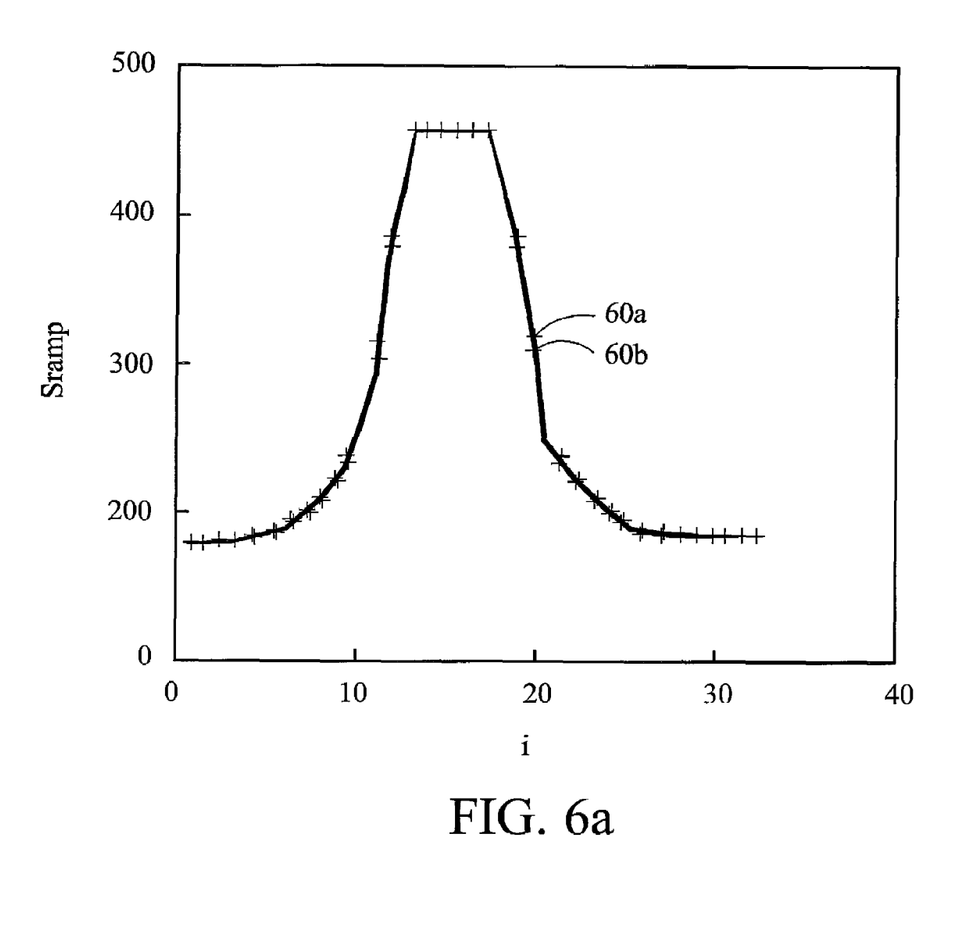
FIGS. 6a and 6b show simulation result of the embodiment.
Figure 6B:
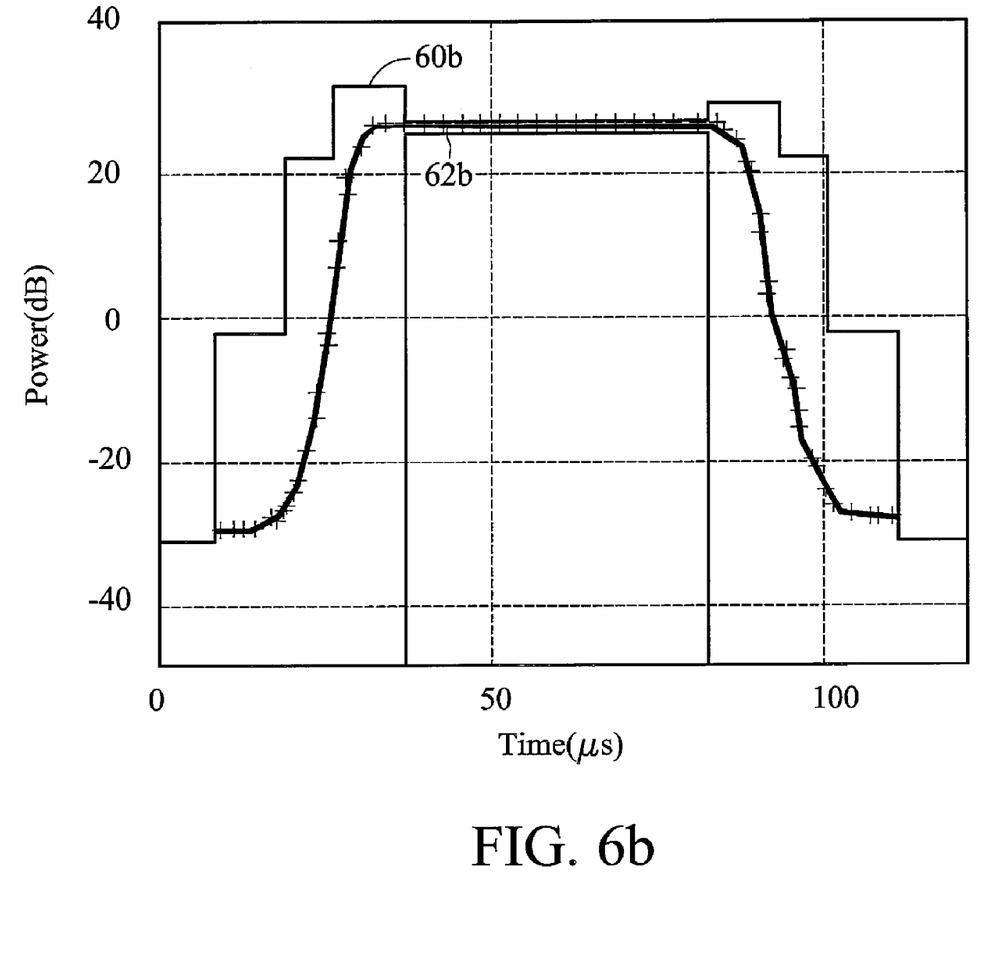

FIGS. 6a and 6b show simulation result of the embodiment, incorporating the transmitter in FIG. 2. Referring to FIG. 6a, the horizontal axis represents index i, the vertical axis represents ramp signal S$_{ramp}$, curve 60a represents the estimates utilizing the lookup table in the prior art, and curve 62a represents the estimates using the calculation in the embodiment. FIG. 6a shows the estimates from the calculation match well with the ones from the prior art. In FIG. 6b, the horizontal axis represents time in μs, the vertical axis represents output power in dBm, 60b represents power limit mask specified in a data transmission specification, 62b represents the output power produced in the embodiment. FIG. 6b shows the output is encompassed within the power limit mask specified in the data transmission specification.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of controlling output power to generate a ramp in a transmitter, comprising:
   receiving a power control level;
   determining a scaling factor according to the power control level;
   determining a difference between an upper power limit and lower power limit according to a position on the ramp;
   compensating the lower power limit according to an operation temperature of the transmitter, wherein the compensation comprises determining a first temperature compensation factor according to the operation temperature, obtaining the compensated lower power limit by adding the first temperature compensation factor to the lower power limit;
   calculating a control signal according to the scaling factor, the compensated lower power limit, and the difference; and
   outputting the output power according the control signal.

2. The method of claim 1, wherein the calculation is based on the following formula:

$$PCL[k]DAC[i]=m[k]*\Delta PCL[i]+PCL_{low}DAC[i]$$

where PCL[k]DAC[i] is the control signal;
m[k] is the scaling factor;
ΔPCL[i] is the difference; and
PCLlowDAC[i] is the lower power limit.

3. The method of claim 1, further comprises compensating the difference according to an operation temperature of the transmitter.

4. The method of claim 3, wherein the compensation comprises determining a second temperature compensation factor according to the operation temperature, obtaining the compensated difference by adding the second temperature compensation factor to the difference; and the calculation comprises calculating the control signal according to the scaling factor, the lower power limit, and the compensated difference.

5. A transmitter, controlling output power to generate a ramp, comprising:
   a baseband module, receiving a power control level, determining a scaling factor according to the power control level, determining a difference between an upper power limit and lower power limit according to a position on the ramp, compensating the lower power limit according to an operation temperature of the transmitter, determining a first temperature compensation factor according to the operation temperature, wherein the compensated lower power limit is obtained by adding the first temperature compensation factor to the lower power limit and calculating a control signal according to the scaling factor, the lower power limit, and the difference; and
   a power amplifier coupled to the baseband module, outputting the output power according the control signal.

6. The transmitter of claim 5, wherein the baseband module calculates the control signal according to the following formula:

$$PCL[k]DAC[i]=m[k]*\Delta PCL[i]+PCL_{low}DAC[i]$$

where PCL[k]DAC[i] is the control signal;
m[k] is the scaling factor;
ΔPCL[i] is the difference; and
PCLlowDAC[i] is the lower power limit.

7. The transmitter of claim 5, wherein the baseband module further compensates the difference according to an operation temperature of the transmitter.

8. The transmitter of claim 7, wherein the baseband module further determines a second temperature compensation factor according to the operation temperature, wherein the compensated difference is obtained by adding the second temperature compensation factor to the difference, and the baseband module calculates the control signal according to the scaling factor, the lower power limit, and the compensated difference.

9. A method of controlling output power to generate a ramp in a transmitter, comprising:
   receiving a power control level;
   determining a scaling factor according to the power control level;
   determining a difference between an upper power limit and lower power limit according to a position on the ramp;
   compensating the difference according to an operation temperature of the transmitter, wherein the compensation comprises determining a second temperature compensation factor according to the operation temperature, obtaining the compensated difference by adding the second temperature compensation factor to the difference;

calculating a control signal according to the scaling factor, the lower power limit, and the compensated difference; and outputting the output power according the control signal.

10. The method of claim 9, wherein the calculation is based on the following formula:

$$PCL[k]DAC[i]=m[k]*\Delta PCL[i]+PCL_{low}DAC[i]$$

where PCL[k]DAC[i] is the control signal;
m[k] is the scaling factor;
ΔPCL[i] is the difference; and
PCLlowDAC[i] is the lower power limit.

11. A transmitter, controlling output power to generate a ramp, comprising:
a baseband module, receiving a power control level, determining a scaling factor according to the power control level, determining a difference between an upper power limit and lower power limit according to a position on the ramp, compensating the difference according to an operation temperature of the transmitter, determining a second temperature compensation factor according to the operation temperature, wherein the compensated difference is obtained by adding the second temperature compensation factor to the difference and calculating a control signal according to the scaling factor, the lower power limit, and the compensated difference; and
a power amplifier coupled to the baseband module, outputting the output power according the control signal.

12. The transmitter of claim 11, wherein the baseband module calculates the control signal according to the following formula:

$$PCL[k]DAC[i]=m[k]*\Delta PCL[i]+PCL_{low}DAC[i]$$

where PCL[k]DAC[i] is the control signal;
m[k] is the scaling factor;
ΔPCL[i] is the difference; and
PCLlowDAC[i] is the lower power limit.

* * * * *